US012776039B2

(12) United States Patent
Abdishektaei et al.

(10) Patent No.: US 12,776,039 B2
(45) Date of Patent: Oct. 27, 2026

(54) DETERMINING DATA REPRESENTING A CHANGE BETWEEN SETS OF MEDICAL IMAGING DATA

(71) Applicant: Siemens Healthineers AG, Forchheim (DE)

(72) Inventors: Mohammad Abdishektaei, Charlottesville, VA (US); Sepehr Farhand, Malvern, PA (US); Matthias Wolf, Coatesville, PA (US); Gerardo Hermosillo Valadez, West Chester, PA (US); Yoshihisa Shinagawa, Downingtown, PA (US)

(73) Assignee: Siemens Healthineers AG, Forchheim (DE)

( * ) Notice: Subject to any disclaimer, the term of this patent is extended or adjusted under 35 U.S.C. 154(b) by 225 days.

(21) Appl. No.: 18/676,877

(22) Filed: May 29, 2024

(65) Prior Publication Data

US 2025/0061575 A1 Feb. 20, 2025

(30) Foreign Application Priority Data

Aug. 14, 2023 (EP) .................................... 23191390

(51) Int. Cl.
*G06T 7/33* (2017.01)
*G06T 7/00* (2017.01)

(52) U.S. Cl.
CPC .............. *G06T 7/0016* (2013.01); *G06T 7/33* (2017.01); *G06T 2207/20081* (2013.01)

(58) Field of Classification Search
CPC ..................... G06T 7/0016; G06T 7/33; G06T 2207/20081; G06V 2201/03; G06V 10/751; G06V 10/761; G06V 10/82; G06V 10/74; G06V 10/40; G06V 10/454; G16H 50/20; G16H 50/70; G16H 30/40; G06F 18/22
USPC .......................................................... 382/128
See application file for complete search history.

(56) References Cited

U.S. PATENT DOCUMENTS

2021/0335464 A1* 10/2021 Poblenz ........... G06Q 10/06315
2023/0041804 A1* 2/2023 Muller .................. G06T 7/0016

OTHER PUBLICATIONS

EP search report in EP Application No. 23191390.6, dated Jan. 26, 2024, 14 pages.

* cited by examiner

*Primary Examiner* — Stephen P Coleman

(57) ABSTRACT

A computer implemented framework for determining data representing a change between first medical imaging data and second medical imaging data is disclosed. Imaging data representative of a difference between the first medical imaging data and the second medical imaging data is obtained. The imaging data is input into a trained image processing machine learning model to generate an image feature vector. A plurality of text feature vectors is obtained, each text feature vector being representative of natural language text describing a respective change in medical imaging data. For each of the plurality of text feature vectors, a similarity measure indicating a degree of similarity to the image feature vector determined. A text feature vector is selected. The data representing the change between the first medical imaging data and the second medical imaging data is determined based on the selected text feature vector.

20 Claims, 6 Drawing Sheets

DETERMINING DATA REPRESENTING A CHANGE BETWEEN SETS OF MEDICAL IMAGING DATA

CROSS-REFERENCE TO RELATED APPLICATION

This application claims the benefit of priority from European Patent Application No. 23191390.6, filed on Aug. 14, 2023, the contents of which are incorporated by reference.

TECHNICAL FIELD

The present disclosure relates to determining data representing a change between two sets of medical imaging data.

BACKGROUND

A follow-up medical image may be taken of a patient after an initial, baseline medical image is taken, for example to assess any changes that have occurred in the patient between the time of the baseline medical image and the time of the follow-up medical image. For example, when a patient is diagnosed with a condition using a baseline medical image, follow-up medical imaging is commonly recommended to monitor progression of the condition. After the follow-up image is taken, a radiologist may review the follow-up image and the baseline image, and write a report describing any progression in the condition. However, interpretation of the follow-up image is a time-consuming task.

In addition, when comparing a baseline image taken at the time of diagnosis with a follow-up image taken later, the images may include artifacts which are not relevant to the progression of the condition. For example, where the lighting or imaging angle or other imaging parameters used to capture the baseline image differs from those used to take the follow-up image, artifacts may be visible. Other irrelevant changes may be apparent in the images. This can make interpretation of the follow-up and baseline images difficult.

It is desirable to provide a computer-implemented method for interpreting, or at least for providing assistance in the interpretation of, follow-up medical images.

SUMMARY

Described herein is a computer-implemented framework for determining data representing a change between first medical imaging data and second medical imaging data. Imaging data representative of the first medical imaging data and the second medical imaging data, or of a difference between the first medical imaging data and the second medical imaging data, is obtained. The imaging data is input into a trained image processing machine learning model to generate an image feature vector representative of the difference between the first medical imaging data and the second medical imaging data. A plurality of text feature vectors is obtained, each text feature vector being representative of natural language text describing a respective change in medical imaging data. For each of the plurality of text feature vectors, a similarity measure indicating a degree of similarity between the image feature vector and the text feature vector is determined. A text feature vector is selected from among the plurality of text feature vectors based on the determined similarity measures. Based on the selected text feature vector, the data representing the change between the first medical imaging data and the second medical imaging data is determined.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Independent of the grammatical term usage, individuals with male, female or other gender identities are included within the term.

Figure 1:
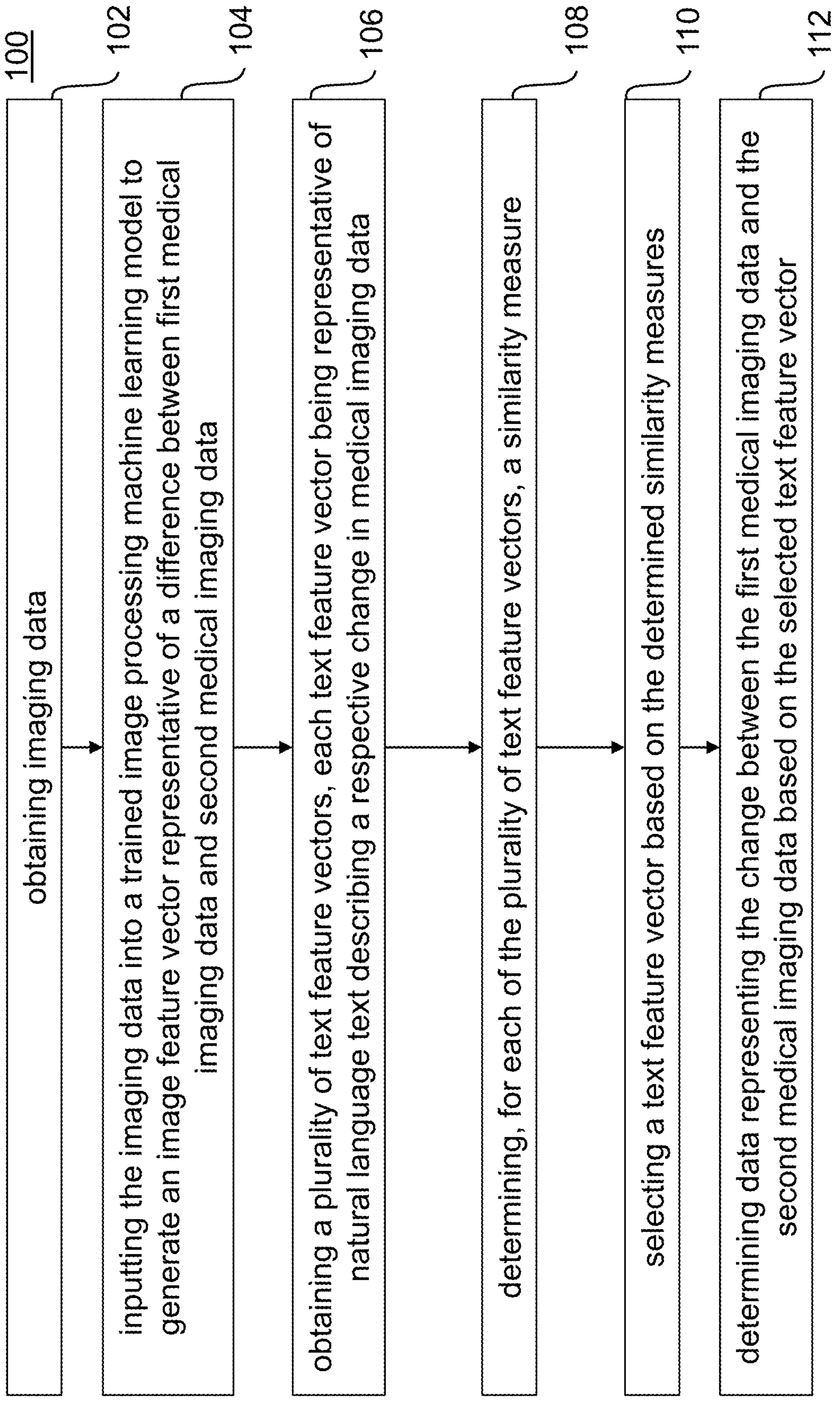
FIG. 1 is a flow diagram illustrating schematically an example method for determining data representing a change between first medical imaging data and second medical imaging data.

Referring to FIG. 1, there is illustrated a computer implemented method 100 for determining data representing a change between first medical imaging data 302 and second medical imaging data 304.

Figure 2A:
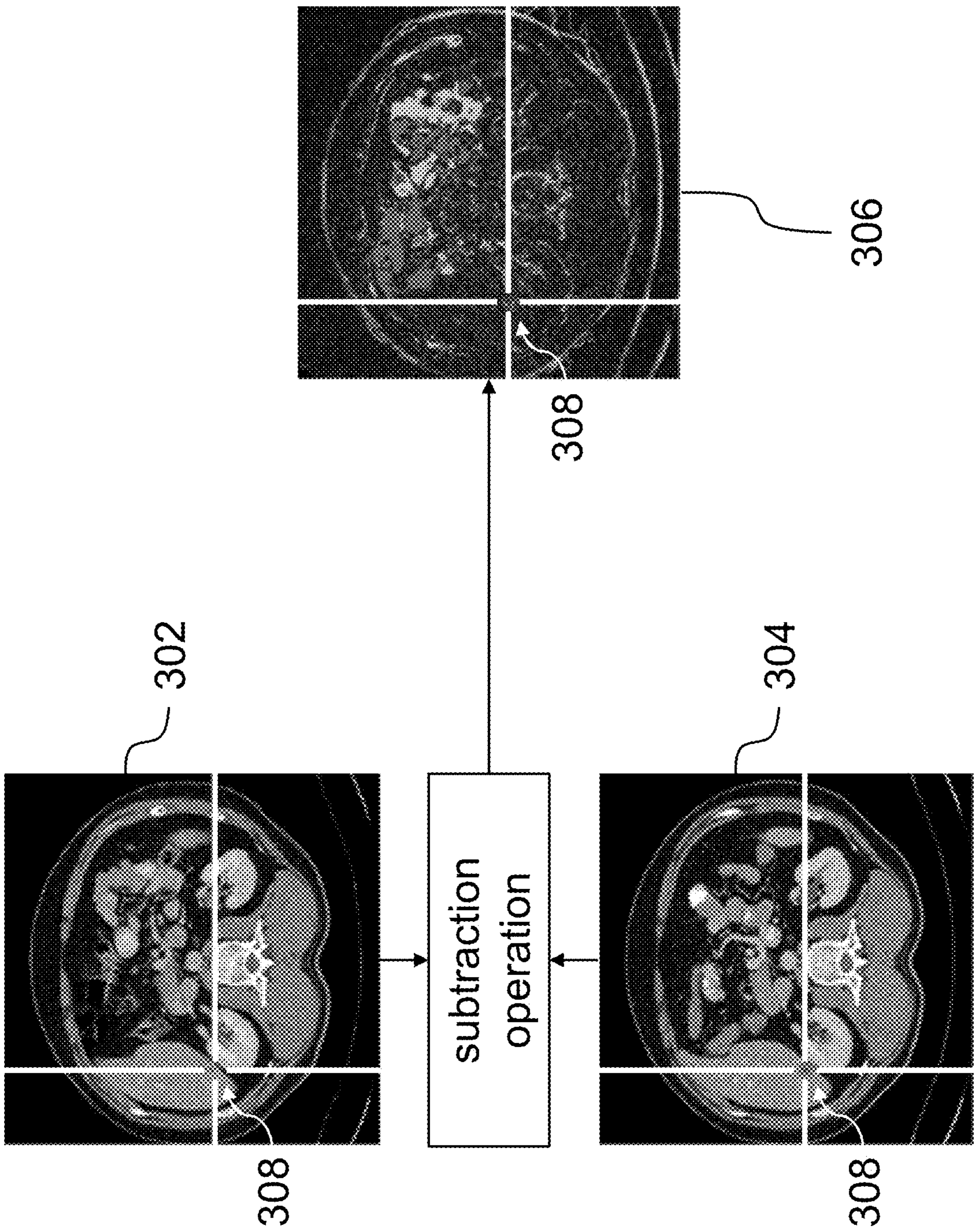
FIG. 2*a* is a flow diagram illustrating schematically an example method for obtaining differential imaging data from first medical imaging data and second medical imaging data.
Figure 3:
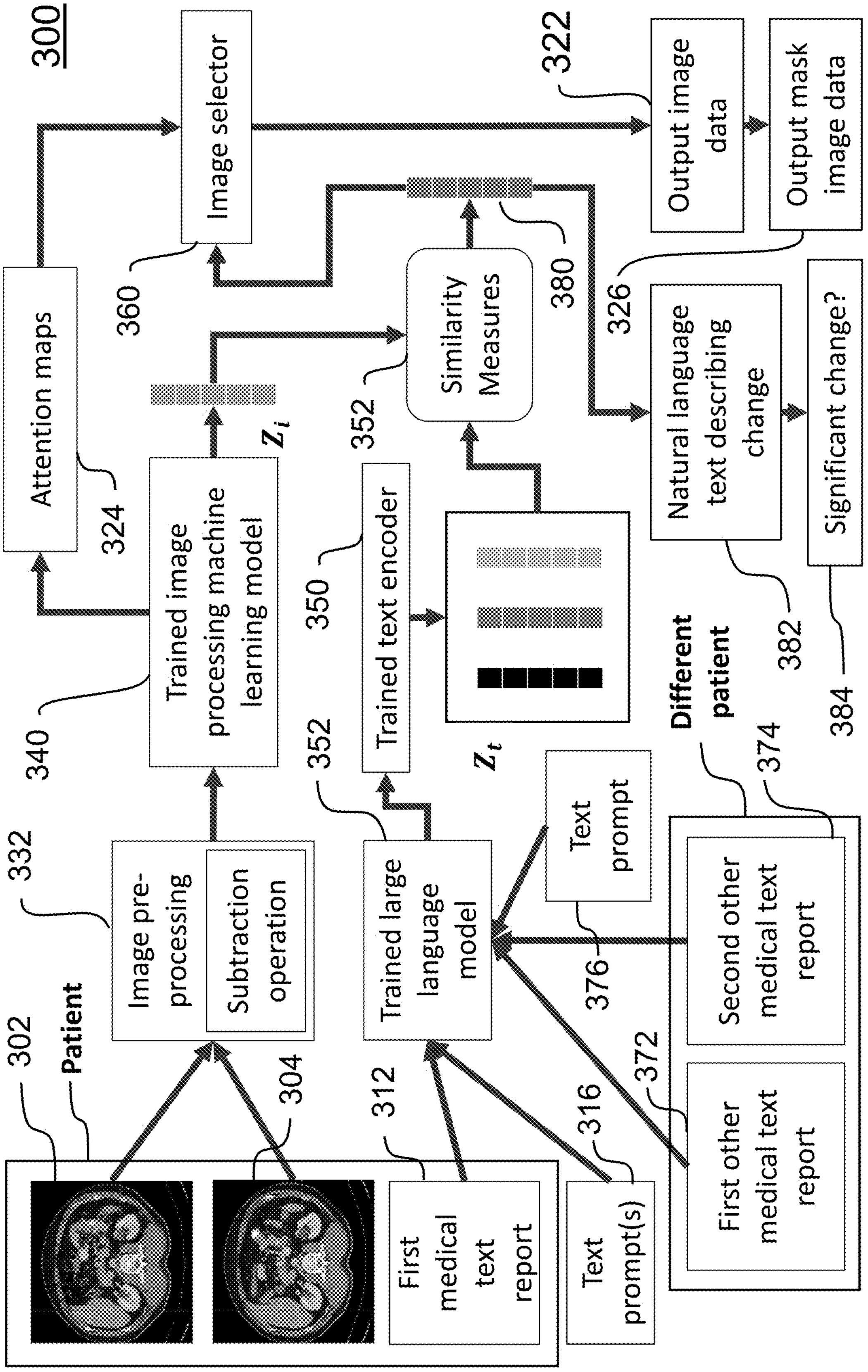
FIG. 3 is a flow diagram illustrating schematically in more detail an example method according to the method illustrated in FIG. 1.

In broad overview, the method 100 comprises: in step 102, obtaining imaging data representative of first medical imaging data 302 and second medical imaging data 304, or of a difference between the first medical imaging data 302 and the second medical imaging data 304 (see FIG. 2*a*); in step 104, inputting the imaging data into a trained image processing machine learning model 340 to generate an image feature vector Zi representative of the difference between the first medical imaging data 302 and the second medical imaging data 304 (for example, the trained image processing machine learning model 340 in FIG. 3); in step 106, obtaining a plurality of text feature vectors Zt, each text feature vector being representative of natural language text describing a respective change in medical imaging data (for example, the plurality of text feature vectors Zt in FIG. 3); in step 108, determining, for each of the plurality of text feature vectors Zt, a similarity measure 352 indicating a degree of similarity between the image feature vector Zi and the text feature vector Zt (for example, the similarity measures 352 in FIG. 3); in step 110, selecting a text feature vector 380 from among the plurality of text feature vectors Zt based on the determined similarity measures 352 (for example, the selected text feature vector 380 in FIG. 3); and in step 112, determining, based on the selected text feature vector 380, the data representing the change between the first medical imaging data 302 and the second medical imaging data 304 (for example, the natural language text describing the change 382, or the output image data 322, in FIG. 3).

Accordingly, data representing a change between first medical imaging data 302 and second medical imaging data 304 is generated.

By generating the image feature vector based on the imaging data using the trained image processing machine learning model, an image feature vector is generated that encodes features relevant to the changes between the first medical imaging data 302 and the second medical imaging data 304. Accordingly, for example, the progression of a condition of a patient depicted in the first medical imaging data 302 and the second medical imaging data 304, can be extracted and encoded into the image feature vector. Based on this image feature vector, a text feature vector representative of natural language text describing a change 382 in medical imaging data is selected. Since the selection is performed by determining a degree of similarity between the image feature vector and the text feature vectors Zt, the selected text feature vector represents natural language text 382 that can accurately describe the difference between the first medical imaging data 302 and the second medical imaging data 304. For example, the selected text feature vector may represent text that accurately describes the progression, for example the extent of progression, of the condition of the patient as indicated by the second medical imaging data as compared to the first medical imaging data. The text feature vector is used to determine data representing the change between the first medical imaging data 302 and the second medical imaging data 304. Basing the determination of the data representing the change on the selected text feature vector therefore allows the data representing the change to accurately represent the difference between the first medical imaging data 302 and the second medical imaging data 304. In examples, the data representing the change may comprise the natural language text 382 corresponding to the selected text feature vector or data derived therefrom, a result of a determination of whether the natural language text 382 corresponding to the selected text feature vector represents a significant change 384, and/or output image data 322 representing a change between the first medical imaging data 302 and the second medical imaging data 304. The data representing the change between the first medical imaging data 302 and the second medical imaging data 304 may thus allow for automation of, and/or assistance in, the interpretation of a follow-up image. For example, a radiologist may use the data representing the change to guide their interpretation and/or reporting of the follow-up image.

The data representing the change may be used by a medical professional in a variety of ways. For example, the medical professional may recommend a course of treatment, or decide that further follow-up imaging is required.

An example method 300 is now described in detail with reference to FIG. 3. The method 300 of FIG. 3 is a specific example of the method 100 of FIG. 1 and includes the steps of the method 100 of FIG. 1.

As mentioned, the method 100 comprises, in step 102, obtaining imaging data representative of first medical imaging data 302 and second medical imaging data 304, or of a difference between the first medical imaging data 302 and the second medical imaging data 304. In the example of FIG. 3, the imaging data comprises differential imaging data 306 representing a difference between the first medical imaging data 302 and the second medical imaging data 304.

Each of the first medical imaging data 302 and the second medical imaging data 304 may comprise an array of elements each having a value. The elements may be pixels, each pixel having at least one value. The at least one value may correspond to or otherwise be representative of an output signal of the medical imaging technique used to generate the medical imaging data. For example, for Magnetic Resonance Imaging, the value of an element (e.g. pixel) may correspond to or represent a rate at which excited nuclei, in a region corresponding to the element, return to an equilibrium state. As another example, in SPECT imaging, the value of an element may correspond to or represent an amount of blood flow in capillaries represented by a given pixel. As another example, in CT imaging, the value of an element may correspond to or represent an amount of X-ray attenuation. In some examples, each element may only have one value. However, in other examples, each element may have or otherwise be associated with multiple values. For example, the multiple values of a given element may represent the values of respective multiple signal channels. For example, each signal channel may represent a different medical imaging signal or property of the imaging subject. In some examples, the at least one value may comprise an element (e.g. pixel) intensity value. For example, an output signal from the medical imaging may be mapped onto a pixel intensity value, for example a value within a defined range of intensity values. For example, for a greyscale image, the intensity value may correspond to a value in the range 0 to 255, where 0 represents a 'black' pixel and 255 represents a 'white' pixel, for example. As another example, for example as in the case of USHORT medical image data, the intensity value may correspond to a value in the range 0 to 65536. As another example, in a color image (e.g. where different colors represent different properties of the imaging subject) each pixel may have three intensity values, e.g. one each for Red, Green, and Blue channels. It will be appreciated that other values may be used.

In some examples, the first medical imaging data 302 is for a patient and has been captured at a first time and the second medical imaging data 304 is for the patient and has been captured at a second, later, time. For example, the first medical imaging data 302 may form part of a baseline study of the patient. As shown in FIG. 3, a first medical text report 312 may be written for the baseline study. The second medical imaging data 304 may form part of a follow-up study of the patient. The follow-up study may be intended to track progression of a medical abnormality 308, and/or to identify occurrence or progression of a medical abnormality 308 after the baseline study. In this example, the first medical imaging data 302 and the second medical imaging data 304 are for a particular region of the patient. For example, the first medical imaging data 302 and the second medical imaging data 304 may be for an abdominal region of the patient, or for a limb of the patient. In other examples, the first medical imaging data 302 and the second medical imaging data 304 may be for the whole body of the patient; that is, they may represent whole body images of the patient. The above-described properties of the first medical imaging data 302 and the second medical imaging data 304 apply to any two sets of medical imaging data described as "first" and "second" as described herein.

Determining data representing the change where the first medical imaging data 302 is for a patient and has been captured at a first time and the second medical imaging data 304 is for the patient and has been captured at a second, later, time, enables computer implemented interpretation of a follow-up medical image. This in turn enables the progression of a condition of the patient to be monitored without necessarily requiring a human to analyze the first medical imaging data 302 and the second medical imaging data 304. Alternatively, or additionally, this may enable computer implemented assistance in the interpretation and/or reporting of a follow-up medical image, or the monitoring of the progression of a condition of a patient, by a medical professional.

Figure 5:
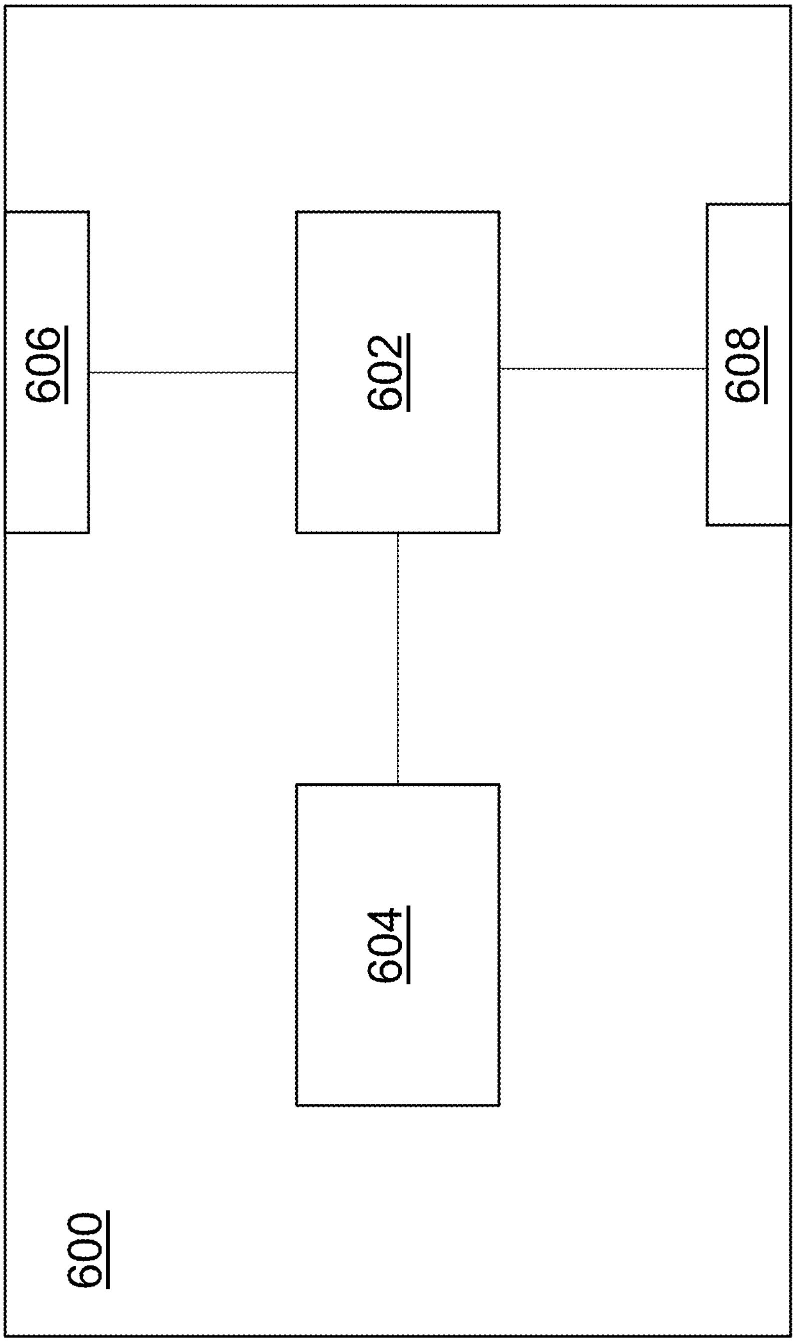
FIG. 5 is a diagram illustrating schematically an apparatus according to an example.

In some examples, the method 300 comprises obtaining the first medical imaging data 302 and the second medical imaging data 304. For example, the first medical imaging data 302 and the second medical imaging data 304 may be retrieved from a storage such as a memory device (see e.g. memory device 604 in FIG. 5, described in more detail below). The first medical imaging data 302 may comprise a plurality of first intensity values, and the second medical imaging data 304 may comprise a plurality of corresponding, second, intensity values. That is, each of the first intensity values in the first medical imaging data 302 corresponds to a certain second intensity value in the second medical imaging data 304. Each of the first intensity values may be associated with a respective pixel location, and each of the second intensity values may be associated with one of the pixel locations, to provide this correspondence.

In this example, the method 300 comprises image pre-processing 332 of the first medical imaging data 302 and the second medical imaging data 304. For example, the image pre-processing 332 may comprise image registration. Image registration generally involves transforming the plurality of first intensity values and the plurality of second intensity values into one coordinate system. The image registration may comprise associating each of the first intensity values with its corresponding second intensity value, and the respective pixel locations may be defined during the image registration.

In some examples, the method 300 comprises, for each of the plurality of first intensity values, comparing the first intensity value with the corresponding second intensity value, to obtain a differential intensity value. In these examples, the differential imaging data 306 comprises the obtained differential intensity values. For example, as illustrated in FIG. 2*a*, comparing the first intensity value with the second intensity value may comprise performing a subtraction operation using the first intensity value and the second intensity value. For example, comparing the first intensity value with the second intensity value may comprise subtracting the second intensity value from the first intensity value, or vice versa. Subtracting the second intensity value from the first intensity value, or vice versa, may allow a computationally simple method to obtain the differential imaging data 306. In the differential imaging data 306 shown in FIGS. 2*a* and 2*b*, the regions in which the intensity value of the second medical imaging data 304 is lower than the intensity value of the first medical imaging data 302 are shown in light grey, and the regions in which the intensity value of the second medical imaging data 304 is higher than the intensity value of the first medical imaging data 302 are shown in dark grey. A medical abnormality 308 is shown on each of the first medical imaging data 302, the second medical imaging data 304, and the differential medical imaging data. The medical abnormality 308 has undergone a subtle change in appearance between the time at which the first medical imaging data 302 was captured and the time at which the second medical imaging data 304 was captured.

Figure 2B:
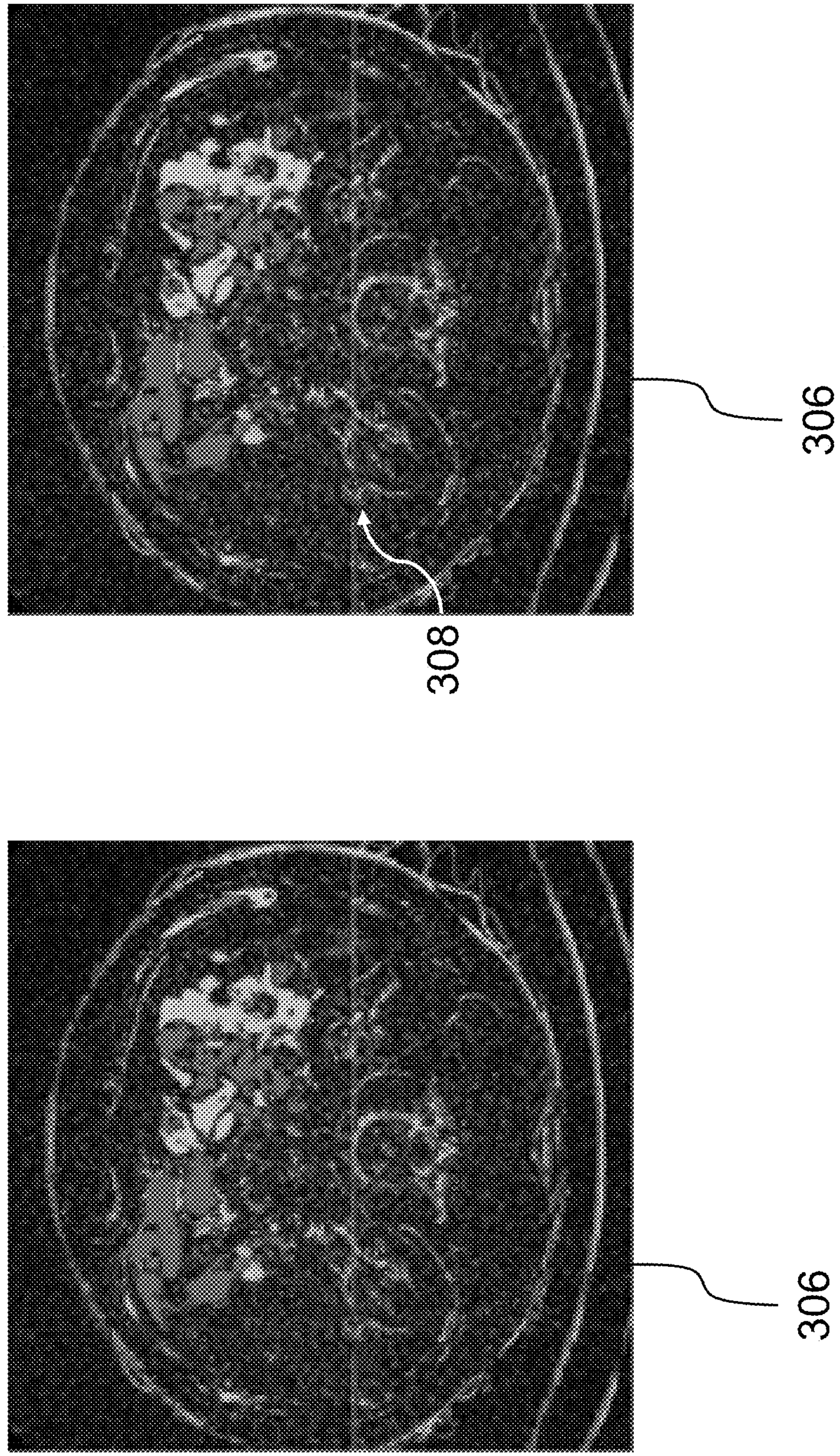
FIG. 2*b* is an illustration of the difficulties associated with identifying a medical abnormality from obtaining differential imaging data by visual inspection, according to an example.

FIG. 2*b* shows two copies of the differential medical imaging data, with the position of the abnormality indicated on the second copy. As will be appreciated from the differential imaging data 306 shown in FIG. 2*b*, it may be difficult to identify a medical abnormality 308 from visual inspection of the differential imaging data 306 alone. Indeed, it may also be difficult for a computer vision system to identify a medical abnormality 308 using the differential imaging data 306 alone. Some examples described herein allow data representing a change between the first medical imaging data 302 and the second medical imaging data 304 to be determined.

As mentioned, the method 100 comprises, in step 104, inputting the imaging data into a trained image processing machine learning model 340 to generate an image feature vector representative of the difference between the first medical imaging data 302 and the second medical imaging data 304. In this example, the imaging data is the differential imaging data 306, and the image feature vector is representative of the differential imaging data 306.

In this example, the trained image processing machine learning model 340 has been trained to generate, based on given imaging data, an image feature vector representative of a difference between given first medical imaging data and given second medical imaging data. In this example, the given imaging data is representative of the difference between the given first medical imaging data and the given second medical imaging data. However, in other examples, the given imaging data may be representative of the given first medical imaging data and the given second medical imaging data. For example, the given imaging data may comprise a concatenation of the given first medical imaging data with the given second medical imaging data. The training process is described in more detail with reference to FIG. 4. Any machine learning model described herein may comprise a neural network.

The image feature vector may accurately represent differences between the first medical imaging data 302 and the second medical imaging data 304. An example way in which the image processing machine learning model 440 may be trained to generate the image feature vector is explained below with reference to FIG. 4.

As mentioned, the method 100 comprises, at step 106, obtaining a plurality of text feature vectors Zt, each text feature vector being representative of natural language text describing a respective change in medical imaging data.

Two example methods are provided herein for generating text feature vectors representative of natural language text describing a respective change in medical imaging data. In some examples, one of the example methods may be used to generate the text feature vectors. In other examples, the first method may be used to generate one or more such text feature vectors and the second method is used to generate another one or more such text feature vectors.

The first method comprises inputting, into a trained large language model 352, a first medical text report 312 associated with the first medical imaging data 302, and a text prompt 316 comprising an instruction to generate, based on the first medical text report 312, natural language text describing a possible change to the first medical imaging data 302.

The trained large language model 352 may be ChatGPT or GPT-4. In the first method, the trained large language model 352 has been trained to (among other things) generate natural language text describing the possible change, based on an input of a given first medical text report associated with given first medical imaging data and a text prompt 316 comprising an instruction to generate, based on the given first medical text report, natural language text describing a possible change to the given first medical imaging data.

In this example, the first medical text report 312 comprises at least one sentence such as "There is a hypodense lesion in the right lobe of the liver." More generally, a medical text report being "associated with" particular medical imaging data means that the medical text report comprises at least one sentence that describes the medical imaging data. The medical text report may have been written by a radiologist who reviewed the medical imaging data.

As mentioned, in the first method, the text prompt 316 comprises an instruction to generate, based on the first medical text report 312, natural language text describing a possible change to the first medical imaging data 302. In this example, a "possible change" to particular imaging data comprises a change that could happen to that imaging data. In this example, the natural language text describing the possible change to the first medical imaging data 302 comprises at least one sentence such as "There is an increase in the size of an hypodense lesion in the right lobe of the liver". In any case, a change (as referred to anywhere herein) can represent the occurrence or progression of a medical abnormality 308. One or more text prompts 316 may be used to generate a plurality of sets of natural language text describing respective possible changes to the first medical imaging data 302. The same text prompts 316 can be used with different first medical text reports (e.g. for different patients), to generate sets of natural language text describing a possible change for each such first medical text report. The text prompts 316 can be referred to as prompt templates. For example, the first text prompt 316 may be:

"Below is a radiology report describing a medical image of a patient.

Determine a possible, theoretical, change in the patient's condition, and describe that change. [first medical text report 312]"

and the trained large language model 352 may then generate the natural language text describing a first possible change.

Following the generation of the first possible change, in the same conversation with the large language model, a second text prompt 316 may be: "Now determine another possible, theoretical, change in the patient's condition, and describe that change".

Other suitable prompts may be used, such as: "determine 10 possible, theoretical changes to the patient's condition as reported in the below radiology report and describe each change [first medical text report 312]". This may result in the output of 10 sets of natural language text that describe 10 possible, theoretical, changes to the patient's condition as reported in the first medical text report. It will be appreciated that 10 is an example and in principle any number may be used. This is an example of where one text prompt 316 may generate a plurality of sets of natural language text.

As another example, other suitable text prompt(s) may be of the form

"generate a sentence that would represent a {significant}/{mild}{worsening}/{improvement} of the patient's medical condition as reported in the below radiology report [first medical text report 312]".

For example, there may be four separate text prompts corresponding, respectively, to 'significant worsening', 'significant improvement', 'mild worsening' and 'mild improvement', each resulting in a respective set of natural language text.

As another example, there may be one text prompt 316 including instructions to generate four sets of natural language text. For example, the one text prompt 316 may be "generate four sentences that would respectively represent a significant worsening, a mild worsening, a significant improvement, and a mild improvement, of the patient's medical condition as reported in the below radiology report [first medical text report 312]".

In either case, a plurality of sets of natural language text are generated that respectively describe possible different changes to patients' condition as described in the first medical text report 312.

In the first method, the possible change does not necessarily describe a change that actually occurred between two sets of medical imaging data. Rather, it merely describes a change that may occur.

By "guessing" a possible change based on the first medical text report 312 using the first method, a text feature vector can be generated (as described further below) whose content relates to the first medical text report 312. The first medical text report 312 typically relates to a specific medical abnormality such as the above-described liver lesion. In an example in which the first medical imaging data 302 and the second medical imaging data 304 relate to the same patient, an important factor to consider in the second medical imaging data 304 is the development of the medical abnormality 308 described in the first medical text report 312. Thus, generating natural language text describing a possible change based on the first medical text report 312 may help ensure that the natural language text 382 describes a relevant change to the first medical imaging data 302. Furthermore, since the selected text feature vector 380 is selected from the plurality of text feature vectors Zt based on similarity measures 352 with the image feature vector, a text feature vector representing text describing the most applicable possible change can be identified.

In the second method, each of the plurality of text feature vectors is representative of natural language text describing a change between respective other first medical imaging data and respective other second medical imaging data. In this example, a given set of other first medical imaging data 302 and other second medical imaging data 304 is for a further patient, different from the patient associated with the first medical imaging data 302 and the second medical imaging data 304, and who may be different from a still further patient associated with another set of other first medical imaging data and other second medical imaging data.

In the second method, each of the plurality of text feature vectors may be generated in advance of obtaining the imaging data 302, 304. For example, each of the plurality of text feature vectors may be generated at the end of the training phase (described in more detail below with reference to FIG. 4). The plurality of text feature vectors may be stored in a memory device and provide a 'dictionary' of text feature vectors each representing respective natural language text that describes respective different changes in medical imaging data. In this example, in order to generate each of the plurality of text feature vectors, the second method comprises inputting, into a trained large language model 352, a respective first medical text report 372 associated with the respective other first medical imaging data, a respective second medical text report 374 associated with the respective other second medical imaging data, and a text prompt 376 comprising an instruction to generate, based on the respective other first medical text report 372 and the respective other second medical text report 374, the natural language text describing the change between the respective other first medical imaging data and the respective other second medical imaging data.

In this example, the trained large language model 352 used in the second method is the same model as the trained large language model 352 used in the first method. In the second method, the trained large language model 352 has been trained to (among other things) generate natural language text describing the change, based on an input of a given first medical text report associated with given first medical imaging data, a given second medical text report associated with given second medical imaging data, and a text prompt 376 comprising an instruction to generate, based on the given first medical text report and the given second medical text report, natural language text describing a change between the given first medical imaging data and the given second medical imaging data.

In this example, in the second method, the text prompt 376 can be the same for all text feature vectors generated. Example text prompts 376 are:

"Write a description of any differences between the following baseline and follow-up radiology reports.

Here is the baseline radiology report. [respective first medical text report 372] Here is the follow-up radiology report. [respective second medical text report 374] ", and "The following radiology reports describe respectively two medical images of the same patient, taken at different times.

Here is the first radiology report. [respective first medical text report 372]

Here is the second radiology report. [respective second medical text report 374]

Write a description of any changes that occurred between the times at which the medical images were taken".

As mentioned, in the second method, the sets of natural language text describing the respective changes may be generated for many such first 372 and second medical text reports 374 prior to obtaining the imaging data, to form a dictionary of changes that may occur between a first set of medical imaging data and a second set of medical imaging data.

In the second method, the natural language text describing the change can describe an actual change that occurred between other first medical imaging data and other second medical imaging data. This allows text feature vectors to be generated that are each tied to real-world examples of a change in medical imaging data and thus each represent a change which could occur between the first medical imaging data 302 and the second medical imaging data 304. Since the selected text feature vector 380 is selected based on a similarity measure 352 with the image feature vector Zi, a text feature vector can be identified which represents text that accurately describes the change between the first medical imaging data 302 and the second medical imaging data 304. Additionally, in contrast with the first method, new sets of natural language text describing possible changes do not have to be generated each time the method 300 is used to determine data representing a change between a given set of first medical imaging data and second medical imaging data.

In this example, in the cases of both the first method and the second method, generating a text feature vector comprises generating, using a trained text encoder 350 and based on the respective generated natural language text describing the change, the text feature vector. In the first method, the text feature vectors each relate to different respective possible changes, while in the second method, the text feature vectors relate to actual changes between sets of medical imaging data. The trained text encoder 350 has been trained to generate, based on the natural language text describing the change, a text feature vector.

In the example second method described above, the large language model is used to generate the sets of natural language text each describing a change between a respective first medical text report 372 associated with a respective other first medical imaging data and a respective second medical text report 374 associated with a respective other second medical imaging data. The trained text encoder 350 is then used to generate a respective text feature vector for each of these sets of natural language text. However, in some examples, the large language model need not necessarily be used. For example, a variation to the second method may involve generating, using the trained text encoder 350, the text feature vector representing natural language text describing the change between the respective other first medical imaging data and the respective other second medical imaging data, based on the respective first medical text report 372 and the respective second medical text report 374. For example, the first respective medical text report 372 and the second respective medical text report 374 may be concatenated and inputted into the trained text encoder 350, and the trained text encoder may output a text feature vector representing natural language text describing the change. As will be described in relation to FIG. 4, in such examples the trained text encoder 350 can be trained to generate a text feature vector which aligns with the image feature vector in an embedding space and thus can represent the change between the first medical imaging data 302 and the second medical imaging data 304.

As mentioned, the method 100 comprises, at step 108, determining, for each of the plurality of text feature vectors Zt, a similarity measure 352 indicating a degree of similarity between the image feature vector and the text feature vector.

In this example, the image feature vector and the plurality of text feature vectors Zt are represented in a common embedding space, and the similarity measure 352 is a distance measure in the common embedding space between the image feature vector and the text feature vector. Any distance measure described herein may be, for example, a Euclidean distance or a cosine distance. By representing the image feature vector and the plurality of text feature vectors Zt in a common embedding space, the distance measure can be used to identify text feature vectors which are closely aligned in their content with the image feature vector. This enables a text feature vector to be selected which represents text that accurately describes the change between the first medical imaging data 302 and the second medical imaging data 304.

As mentioned, the method 100 comprises, at step 110, selecting a text feature vector 380 from among the plurality of text feature vectors Zt based on the determined similarity measures 352.

In this example, selecting the text feature vector 380 comprises selecting a text feature vector from the plurality of text feature vectors Zt that corresponds to a lowest distance measure of the distance measures. That is, each of the distance measures has a value, and selecting the text feature vector comprises selecting the text feature vector 380 for which the distance measure between that text feature vector and the image feature vector is the lowest.

As mentioned, the method 100 comprises, at step 112, determining, based on the selected text feature vector 380, the data representing the change between the first medical imaging data 302 and the second medical imaging data 304.

We describe herein several examples of the data representing the change between the first medical imaging data 302 and the second medical imaging data 304. The data representing the change may comprise data according to any combination of the examples described.

In a first example, the data representing the change comprises the natural language text 382 represented by the selected text feature vector 380 or data derived therefrom. For example, determining the data representing the change may comprise determining the natural language text 382 represented by the selected text feature vector 380. The data representing the change may then comprise the natural language text 382 represented by the selected text feature itself, and/or data derived therefrom such as key words from the natural language text 382 or a rewording of the natural language text, for example. This may assist a radiologist in interpreting the second medical imaging data 304. For example, where the first medical imaging data 302 relates to a patient and the second medical imaging data 304 relates to the same patient, the natural language text 382 representing the change (or data, such as text derived therefrom), may alert the radiologist to medically relevant changes that may have occurred between those sets of medical imaging data.

In a second example, determining the data representing the change comprises determining whether the natural language text 382 represented by the selected text feature vector 380 describes a significant change 384. A significant change 384 may refer to, for example, a medically significant change, such as the growth of a lesion. Alternatively, a significant change 384 may refer to a large or pronounced change, as opposed to a minor change, such as the substantial growth of a lesion. Determining whether the natural language text 382 represented by the selected text feature vector 380 describes a significant change 384 may comprise performing a text mining operation on the natural language text 382 represented by the selected feature vector. The text mining may seek to determine whether the natural language text 382 includes key words, such as "growth" or "increase", that may relate to a significant change 384. In the above-mentioned example where the natural language text 382 describing a change is "There is an increase in the size of a hypodense lesion in the right lobe of the liver", the text mining operation may identify the word "increase" and determine that there has been a significant change 384.

Alternatively, the trained large language model 352 may be used to determine whether the natural language text 382 describes a significant change 384. For example, the trained large language model 352 may be provided with the natural language text 382 accompanied by a text prompt such as "Does this describe a significant change? Provide a yes or no answer". The "yes" or "no" output of the trained large language model 352 may be used to determine that the natural language text 382 describes a significant or non-significant change 384, respectively. As another example, each generated text feature vector (for example generated according to the first or second method of generating text feature vectors as described above) may be stored in association with a tag that indicates whether the natural language text represented by the text feature vector describes a significant change 384. In such a case, determining whether the natural language text 382 describes a significant change 384 is performed based on the tag.

In the second example, the data representing the change comprises an indication of whether the natural language text 382 represented by the selected text feature vector 380 describes a significant change 384. For example, the data representing the change may represent text that describes as such, for example "There is a significant change". Alternatively, the data representing the change may comprise a 1-bit indicator of whether the natural language text 382 represented by the selected text feature vector 380 describes a significant change 384.

The second example can enable a medical professional to, for example, be alerted to the fact that it has been determined that there is a significant change 384 between the first medical imaging data 302 and the second medical imaging data 304. This can enable the medical professional to confirm this information and determine whether further follow-up imaging or treatment is required, in response to the indication of whether the change is significant.

In a third example, the method 300 comprises outputting, by the trained image processing machine learning model 340 and based on the imaging data and the selected text feature vector 380, output image data 322 representing a change between the first medical imaging data 302 and the second medical imaging data 304, wherein the data representing the change comprises the output image data 322.

For example, the method 300 may comprise generating, using the trained image processing machine learning model 340, a plurality of sets of image data, each set of image data representing a change between the first medical imaging data 302 and the second medical imaging data 304 and each set of image data being represented by a respective feature vector. Each set of image data may comprise an attention map. In this example, the trained image processing machine learning model 340 has been trained to generate, based on an input of given imaging data, one or more attention maps 324. Through training the trained image processing machine learning model 340 with the loss function 470 described below with reference to FIG. 4, the trained image processing machine learning model 340 is capable of producing an attention map which indicates features of the imaging data that represents information pertinent to a medical text report.

Each attention map may be indicative of the extent to which a particular portion or segment of the differential imaging data 306 contributes to the encoding or a particular part of the encoding performed by the trained image processing machine learning model 340. For example, each attention map may relate to a different segment, or a different context, of the imaging data. A segment may comprise a sub-plurality of the differential intensity values. The trained image processing machine learning model 340 may segment the differential imaging data 306 into the attention maps 324 according to the contribution of each particular segment, or context, to the encoding. For example, the trained image processing machine learning model 340 may be configured to segment the differential imaging data 306 based on the locations of possible abnormalities occurring in the differential imaging data 306.

The method 300 may then comprise determining, using an image selector 360, for each of the plurality of sets of image data (e.g. attention maps 324), a further similarity measure indicating a degree of similarity between the respective feature vector representing the image and the selected text feature vector 380. In the third example, the respective feature vectors and the selected text feature vector 380 are represented in a common embedding space, and the further similarity measure is a further distance measure in the common embedding space between the respective feature vector and the selected text feature vector 380.

In the third example, the output image data 322 is selected from among the plurality of sets of image data based on the determined further similarity measures. In the third example, selecting the output image data 322 comprises selecting, by the image selector 360, a feature vector from the feature vectors that corresponds to a lowest further distance measure of the further distance measures. That is, each of the further distance measures has a value, and selecting the output image data 322 comprises selecting the output image data 322 represented by the feature vector for which the further distance measure between that feature vector and the text feature vector is the lowest. In examples, the output image data 322 may comprise the attention map corresponding to this feature vector, or data derived from this attention map. The output image data 322 may, instead of comprising the attention map corresponding to this feature vector, be generated by inputting the attention map to the image selector 360.

In the third example, the output image data 322 provides a visual illustration of one or more parts of the medical imaging data that are relevant to the change described by the natural language text 382 represented by the selected text feature vector. Where the imaging data is the differential imaging data 306, the output image data 322 can provide a visual illustration of the relevant difference between the first medical imaging data 302 and the second medical imaging data 304, which may be used to assist a radiologist in interpretation and/or reporting of the second medical imaging data 304.

In a fourth example, the data representing the change may comprise saliency map or output mask data 326. For example, in this fourth example, the method 300 may comprise generating the output image data 322 according to the third example, where the output image data 322 comprises a plurality of output intensity values each having corresponding pixel locations. In some examples, the output image data 322 generated according to the third example (e.g. the attention map) may be of a relatively low resolution, for example as compared to the second medical imaging data 304. In these cases, the method may comprise up-sampling the output image data 322 generated according to the third example, for example so as to produce output image data 322 with the same dimensions as the second medical imaging data 304. Nonetheless this up-sampled output image data 322 comprises a plurality of output intensity values each having corresponding pixel locations. In the fourth example, the method 300 comprises determining whether one or more of the plurality of output intensity values meet a condition; and based on the determination, outputting output mask image data 326 representing pixel locations of output intensity values meeting the condition. In the fourth example, the condition is a threshold. The threshold may comprise a specified intensity value.

By applying such a masking function to the output image data 322, a mask can be generated which indicates only the pixel locations that are relevant to the change described by the natural language text 382 corresponding to the selected text feature vector. Specifically, the output mask data 326 can indicate parts of the attention map which indicate medically significant aspects of the second medical imaging data 304, including those which may represent medically significant changes. This can help a radiologist to quickly identify parts of the second medical imaging data 304 which relate to a medical abnormality.

Figure 4:
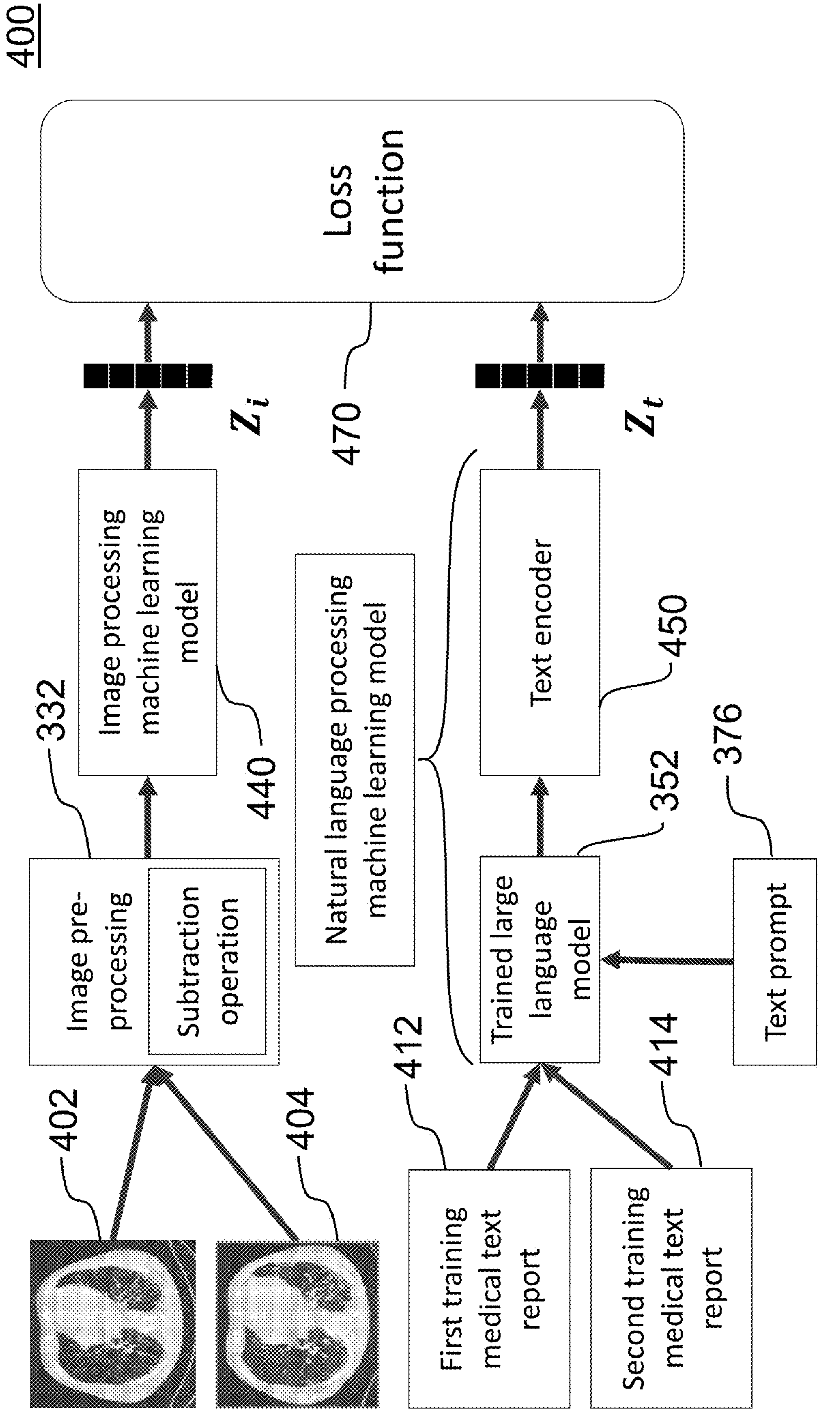
FIG. 4 is a flow diagram illustrating schematically an example method for training a machine learning model to perform the method illustrated in FIG. 1.

In the examples of FIGS. 1 to 3, the trained image processing machine learning model 340 has been trained according to a training method 400 as now described in detail with reference to FIG. 4. In the example of FIG. 4, the trained text encoder 350 has also been trained according to the training method 400. A trained machine learning model may comprise the trained image processing machine learning model 340 and a trained natural language processing machine learning model. Here, the trained natural language processing model may comprise the trained text encoder 350 and optionally the trained large language model 352. The trained large language model 352 (e.g. ChatGPT) itself may have been trained in a separate process, and may be used in the course of the training method 400 in its already trained form.

The training method 400 comprises providing a machine learning model. The machine learning model comprises (a) an image processing machine learning model 440 configured to generate, based on given imaging data representative of given first medical imaging data and given second medical imaging data, or of a difference between the given first medical imaging data and the given second medical imaging data, an image feature vector representative of the difference between the given first medical imaging data and the given second medical imaging data. In this example, the given imaging data is given differential imaging data representing the difference between the given first medical imaging data and the given second medical imaging data. The machine learning model also comprises (b) a natural language processing machine learning model configured to generate, based on given text data representative of a given first medical text report associated with the given first medical imaging data and a given second medical text report associated with the given second medical imaging data, or of given natural language text describing a change between the given first medical imaging data and the given second medical imaging data, a text feature vector. In the former example of the natural language processing machine learning model (not shown in FIG. 4), where the text feature vector is generated based on given text data representative of the given first medical text report and the given second medical text report, the given first medical text report and the given second medical text report may be concatenated and inputted to the natural language processing machine learning model, as described above. In the latter example (shown in FIG. 4), the trained large language model 352 with an appropriate prompt may be used to generate the given natural language text from the given first medical text report and the given second medical text report, in the manner described above in relation to the first other medical text report and the second other medical text report. A text encoder 450 is then used to generate the text feature vector, also in the manner described above by the trained text encoder 350 with reference to FIG. 3.

The training method 400 comprises providing training data. The training data comprises a plurality of sets of training imaging data, each set of training imaging data being representative of first training medical imaging data 402 and second training medical imaging data 404, or of a difference between the first training medical imaging data 402 and the second training medical imaging data 404. In this example, the training imaging data is training differential imaging data 306 representing the difference between the first training medical imaging data 402 and the second training medical imaging data 404. In other examples, the training imaging data may comprise a concatenation of the first training medical imaging data 402 with the second training medical imaging data 404.

The training data further comprises, for each set of training imaging data, text data representative of a first training medical text report 412 associated with the first training medical imaging data 402 and a second training medical text report 412 associated with the second training medical imaging data 404, or of natural language text describing a change between the first training medical imaging data 402 and the second training medical imaging data 404. The natural language text describing the change between the first training medical imaging data 402 and the second training medical imaging data 404 can be generated using the first medical text report 312 and the second medical text report in the same way that the natural language text describing the change between the other first medical imaging data 302 and the other second medical imaging data 304 can be generated using the respective first medical text report and the respective second medical text report, i.e. using the trained large language model 352.

In this example, the plurality of sets of training imaging data comprises, for each set of training imaging data, text data representative of the respective first medical text report and the respective second medical text report. For example, the respective first medical text report 372 and the respective second medical text report 374 may be concatenated and input into the text encoder 450 to generate a text feature vector, as described above in the "variation to the second method". In other examples, the plurality of sets of training imaging data comprises, for each set of training imaging data, text data representative of the natural language text describing the change between the respective other first medical imaging data and the respective other second medical imaging data. For example, the respective first medical text report 372 and the respective second medical text report 374 may be inputted with a text prompt such as text prompt 376 to generate the natural language text describing the change, and the natural language text can be inputted into the text encoder 450 to generate a text feature vector, as described above in the second method.

Using the same medical text reports in the training process (to train the text encoder 450) and in the inference process (to generate a plurality of text feature vectors Zt) can allow the number of medical text reports that need to be acquired, to be reduced, as compared with using different medical text reports in the training and inference processes. Furthermore, the dictionary described above comprising text feature vectors, can be built up during the training method 400, or determined and stored in advance of performing the inference process (method 300). This means that text feature vectors do not have to be freshly generated during performance of the inference process, which may help provide for a computationally efficient inference process.

The training method 400 comprises training the machine learning model based on the training data. Training the machine learning model comprises training the machine learning model so as to minimize a loss function 470 between the image feature vectors generated for the sets of training imaging data by the image processing machine learning model 440 and the corresponding text feature vectors generated for the sets of training imaging data by the natural language processing machine learning model. As stated above, in this example, the training imaging data is the training differential imaging data.

In this example, the loss function 470 is a function of an input image feature vector generated for a set of training imaging data by the image processing machine learning model 440 and an input corresponding text feature vector generated for the same set of training imaging data. Training the machine learning model so as to minimize the loss function 470 comprises, for each set of training imaging data, minimizing the loss function 470 between the generated image feature vector and the generated text feature vector.

In this example, minimizing the loss function 470 comprises reducing a distance in the common embedding space between an image feature vector generated for a given set of the plurality of sets of training differential imaging data and a text feature vector generated for the given set. That is, the loss function 470 may tend to attract an image feature vector to the text feature vector generated for the same set of training differential imaging data in the common embedding space.

The loss function 470 typically has the effect that during performance of the method 300 of FIGS. 1 to 3 (i.e. during inference), the image feature vector generated by the trained image processing machine learning model 340 captures the features that would be considered relevant when writing the natural language text describing the change 382 between the first medical imaging data 302 and the second medical imaging data 304. This is because, by virtue of the training using the loss function 470, the first machine learning model is trained to generate an image feature vector that is close to the text feature vector in the common embedding space.

In some examples, the loss function 470 is a contrastive loss function 470. Minimizing the contrastive loss function 470 comprises, in addition to the above property of the loss function 470, increasing a distance in the common embedding space between one of an image feature vector or a text feature vector generated for one set of the plurality of sets of training differential imaging data, and one of an image feature vector or a text feature vector generated for another set of the plurality of sets of training differential imaging data. That is, the contrastive loss function 470 tends to separate feature vectors belonging to different sets from one another. The contrastive loss function 470 typically has the functional form:

$$\max S(Zi_{1d},Zt_{1d})+S(Zi_{2d},Zt_{2d})$$

$$\min S(Zi_{1d},Zt_{2d})+S(Zi_{2d},Zt_{1d})$$

where S(x, y) is a function whose value decreases as the distance between x and y increases, 1d is a first set of the plurality of sets of training data, and 2d is a second set of the plurality of sets of training data different from the first set. Zi is an image feature vector, and Zt is a text feature vector. Thus, for example, $S(Zi_{2d}, Zt_{1d})$ refers to the distance between the image feature vector generated by the image processing machine learning model 440 for a second set, and the text feature vector generated by the text encoder 450 for a first set different from the second set.

Different sets of training data correspond to different changes in medical imaging data, for example for different patients. The contrastive loss function provides that the text and/or image feature vectors representing these different changes are spaced apart in the common embedding space, but that the image feature vector and text feature vector for any one set of training data are close together. This helps ensure that, at inference, the image feature vector representative of the difference between first medical imaging data 302 and second medical imaging data 304 will be close to a text feature vector that represents natural language text that accurately describes the change between the first medical imaging data 302 and second medical imaging data 304, but distant from text feature vectors that represent natural language text that describe different changes. Accordingly, using the contrastive loss function during training may help allow for data that accurately represents the change between the first medical imaging data and the second medical imaging data to be determined at inference.

Referring to FIG. 6, there is illustrated an apparatus 600 according to an example. The apparatus 600 comprises an input interface 606, an output interface 608, a processor 602 in communication with a non-transitory memory device 604. The processor 602 and the non-transitory memory device 604 may be configured to perform the method 100, 300 or the training method 400 according to any one of the examples described above with reference to FIGS. 1 to 4. The memory device 604 may store instructions or computer readable program code which, when executed by the processor 602 cause the processor 602 to perform the method 100, 300 according to any one of the examples described above with reference to FIGS. 1 to 3, and/or the training method 400 according to any one of the examples described above with reference to FIG. 4. The instructions may be stored on any computer readable medium, for example any non-transitory computer readable medium.

For example, the input interface 606 may receive imaging data, the processor 602 may implement the method 100, 300 described above with reference to FIGS. 1 to 3 to determine the data representing the change, and the processor 602 may output, via the output interface 608, the data representing the change. In some examples, the data representing the change may be transmitted to a structured storage (not shown) so that the output data is stored in the structured storage. In some examples, the data representing the change is transmitted to a display device (not shown) for example of a user terminal to allow a user to review the output data. In some examples, the output data may be stored, alternatively or additionally, in the memory 604.

As another example, alternatively or additionally, the input interface 606 may receive the training data, the processor 608 may implement training of the machine learning model as described above with reference to FIG. 4, and the processor 602 may output, via the output interface 608, the trained machine learning model, the trained image processing machine learning model 340, the trained text encoder 350, or data representing any of these trained models. In some examples, any of the trained models or data representing them may be stored in an external storage (not shown) or transmitted to another computer (not shown) for use by the other computer (not shown) to perform the method 100, 300 according to any one of the examples described above with reference to FIGS. 1 to 3. In some examples, any of the trained models or data representing them may be alternatively or additionally stored in the memory 604 or another local storage of the apparatus 600, for example for use by the apparatus 600 in implementing the method 100, 300 according to any one of the examples described above with reference to FIGS. 1 to 3.

The apparatus 600 may be implemented as a processing system and/or a computer. It will be appreciated that the methods 100, 300, 400 according to any one of the examples described above with reference to FIGS. 1 to 4 are computer implemented methods, and that these methods 100, 300, 400 may be implemented by the apparatus 600.

Although in some of the above examples the imaging data is differential imaging data 306 representing a difference between first medical imaging data 302 and second medical imaging data 304, it should be understood that in other examples the imaging data may instead be representative of the first medical imaging data 302 and the second medical imaging data 304. For example, obtaining the imaging data may comprise concatenating the first medical imaging data 302 and the second medical imaging data 304. The method 300 may then comprise, instead of inputting the differential imaging data 306 into the trained image processing machine learning model 340, inputting the concatenated imaging data into the trained image processing machine learning model 340. The image processing machine learning model 440, by virtue of the training using the loss function 470, is nevertheless capable of generating an image feature vector representative of the difference between the first medical imaging data 302 and the second medical imaging data 304.

This equally applies to the training imaging data; that is to say that instead of the training method 400 using training differential imaging data representing the difference between first training medical imaging data 402 and second training medical imaging data 404, the training method 400 may use training imaging data representative of the first training medical imaging data 402 and the second training medical imaging data 404. For example, each set of training imaging data may comprise a concatenation of the first training medical imaging data 402 and the second training medical imaging data 404.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

According to a first aspect of the present framework, there is provided a computer-implemented method for determining data representing a change between first medical imaging data and second medical imaging data, the method comprising: obtaining imaging data representative of the first medical imaging data and the second medical imaging data, or of a difference between the first medical imaging data and the second medical imaging data; inputting the imaging data into a trained image processing machine learning model to generate an image feature vector representative of the difference between the first medical imaging data and the second medical imaging data; obtaining a plurality of text feature vectors, each text feature vector being representative of natural language text describing a respective change in medical imaging data; determining, for each of the plurality of text feature vectors, a similarity measure indicating a degree of similarity between the image feature vector and the text feature vector; selecting a text feature vector from among the plurality of text feature vectors based on the determined similarity measures; and determining, based on the selected text feature vector, the data representing the change between the first medical imaging data and the second medical imaging data.

Optionally, the trained image processing machine learning model has been trained to generate, based on given imaging data, an image feature vector representative of a difference between given first medical imaging data and given second medical imaging data.

Optionally, the given imaging data is representative of the given first medical imaging data and the given second medical imaging data.

Optionally, the given imaging data is representative of the difference between the given first medical imaging data and the given second medical imaging data.

Optionally, the first medical imaging data is for a patient and has been captured at a first time and the second medical imaging data is for the patient and has been captured at a second, later, time.

Optionally, the first medical imaging data and the second medical imaging data are for a particular region of the patient.

Optionally, the change represents the occurrence or progression of a medical abnormality.

Optionally, the method comprises storing the data representing the change in a storage device.

Optionally, the method comprises outputting the data representing the change to a user terminal.

Optionally, determining the data representing the change comprises determining the natural language text represented by the selected text feature vector.

Optionally, the data representing the change comprises the natural language text represented by selected text feature vector or data derived therefrom.

Optionally, determining the data representing the change comprises determining whether the natural language text represented by the selected text feature vector describes a significant change, and the data representing the change comprises an indication of whether the natural language text represented by the selected text feature vector describes a significant change.

Optionally, the method comprises outputting, by the trained image processing machine learning model and based on the imaging data and the selected text feature vector, output image data representing a change between the first medical imaging data and the second medical imaging data, wherein the data representing the change comprises the output image data.

Optionally, the output image data comprises attention map data.

Optionally, the method comprises: generating, using the trained image processing machine learning model, a plurality of sets of image data, each set of image data representing a change between the first medical imaging data and the second medical imaging data and each set of image data being represented by a respective feature vector; and determining, for each of the plurality of sets of image data, a further similarity measure indicating a degree of similarity between the respective feature vector representing the image and the selected text feature vector, wherein the output image data is selected from among the plurality of sets of image data based on the determined further similarity measures.

Optionally, each of the plurality of sets of image data comprises respective attention map data.

Optionally, the output image data comprises a plurality of output intensity values each having corresponding pixel locations, and the method comprises: determining whether one or more of the plurality of output intensity values meet a condition; and based on the determination, outputting output mask image data representing pixel locations of output intensity values meeting the condition.

Optionally, the condition is a threshold.

Optionally, the method comprises: obtaining the first medical imaging data and the second medical imaging data, the first medical imaging data comprising a plurality of first intensity values and the second medical imaging data comprising a plurality of corresponding, second, intensity values; and for each of the plurality of first intensity values, comparing the first intensity value with the corresponding second intensity value, to obtain a differential intensity value, wherein the imaging data comprises the obtained differential intensity values.

Optionally, comparing the first intensity value with the second intensity value comprises performing a subtraction operation using the first intensity value and the second intensity value.

Optionally, the method comprises: prior to comparing the first intensity values with the second intensity values, registering the first medical imaging data with the second medical imaging data by transforming the plurality of first intensity values and the plurality of second intensity values into one coordinate system.

Optionally, the image feature vector and the plurality of text feature vectors are represented in a common embedding space, and the similarity measure is a distance measure in the common embedding space between the image feature vector and the text feature vector.

Optionally, selecting the text feature vector comprises selecting a text feature vector from the plurality of text feature vectors that corresponds to a lowest distance measure of the distance measures.

Optionally, the method comprises generating each of one or more of the plurality of text feature vectors by inputting: a first medical text report associated with the first medical imaging data, and a text prompt comprising an instruction to generate, based on the first medical text report, natural language text describing a possible change to the first medical imaging data, into a trained large language model; and generating, using a trained text encoder and based on the respective generated natural language text describing the possible change, the text feature vector.

Optionally, the trained large language model has been trained to generate natural language text describing the possible change, based on an input of a given first medical text report associated with given first medical imaging data and a text prompt comprising an instruction to generate, based on the given first medical text report, natural language text describing a possible change to the given first medical imaging data; and the trained text encoder has been trained to generate, based on the natural language text describing the possible change, a text feature vector.

Optionally, each of the plurality of text feature vectors is representative of natural language text describing a change between respective other first medical imaging data and respective other second medical imaging data.

Optionally, the data representing the change comprises the natural language text represented by the selected text feature vector.

Optionally, the method comprises generating each of one or more of the plurality of text feature vectors by inputting: a respective first medical text report associated with the respective other first medical imaging data, a respective second medical text report associated with the respective other second medical imaging data, and a text prompt comprising an instruction to generate, based on the respective other first medical text report and the respective other second medical text report, the natural language text describing the change between the respective other first medical imaging data and the respective other second medical imaging data, into a trained large language model; and generating, using a trained text encoder and based on the respective generated natural language text describing the change, the text feature vector.

Optionally, for each of the text feature vectors, the respective other first medical imaging data is for a respective patient and has been captured at a first time and the respective other second medical imaging data is for the respective patient and has been captured at a second, later, time.

Optionally, the trained large language model has been trained to generate natural language text describing the change, based on an input of a given first medical text report associated with given first medical imaging data, a given second medical text report associated with given second medical imaging data, and a text prompt comprising an instruction to generate, based on the given first medical text report and the given second medical text report, natural language text describing a change between the given first medical imaging data and the given second medical imaging data; and the trained text encoder has been trained to generate, based on the natural language text describing the change, a text feature vector.

Optionally, a trained machine learning model comprises the trained image processing machine learning model and a trained natural language processing machine learning model, and the trained image processing machine learning model has been trained according to a training method comprising: providing a machine learning model, the machine learning model comprising: (a) an image processing machine learning model configured to generate, based on given imaging data representative of given first medical imaging data and given second medical imaging data, or of a difference between the given first medical imaging data and the given second medical imaging data, an image feature vector representative of the difference between the given first medical imaging data and the given second medical imaging data, and (b) a natural language processing machine learning model configured to generate, based on given text data representative of a given first medical text report associated with the given first medical imaging data and a given second medical text report associated with the given second medical imaging data, or of given natural language text describing a change between the given first medical imaging data and the given second medical imaging data, a text feature vector; providing training data comprising a plurality of sets of training imaging data, each set of training imaging data being representative of first training medical imaging data and second training medical imaging data, or of a difference between the first training medical imaging data and the second training medical imaging data, the training data further comprising, for each set of training imaging data, text data representative of a first training medical text report associated with the first training medical imaging data and a second training medical text report associated with the second training medical imaging data, or of natural language text describing a change between the first training medical imaging data and the second training medical imaging data; and training the machine learning model based on the training data so as to minimize a loss function between the image feature vectors generated for the sets of training imaging data by the image processing machine learning model and the corresponding text feature vectors generated for the sets of training imaging data by the natural language processing machine learning model.

Optionally, the plurality of sets of training imaging data comprises, for each set of training imaging data, text data representative of the respective first medical text report and the respective second medical text report, or of the natural language text describing the change between the respective other first medical imaging data and the respective other second medical imaging data.

Optionally, the loss function is a contrastive loss function.

Optionally, minimizing the contrastive loss function comprises: reducing a distance in the common embedding space between: an image feature vector generated for a given set of the plurality of sets of training imaging data, and a text feature vector generated for the given set; and/or increasing a distance in the common embedding space between: one of: an image feature vector generated for a first set of the plurality of sets of training imaging data and a text feature vector generated for the first set, and one of: an image feature vector generated for a second set of the plurality of sets of training imaging data and a text feature vector generated for the second set.

According to a second aspect of the present framework, there is provided apparatus configured to perform the method according to the first aspect.

Optionally, the apparatus comprises the storage device and/or the user terminal.

According to a third aspect of the present framework, there is provided a computer program which, when executed by a computer, causes the computer to perform the method according to the first aspect.

The foregoing examples have been provided merely for the purpose of explanation and are in no way to be construed as limiting of the present framework disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein, rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer-implemented method for determining data representing a change between first medical imaging data and second medical imaging data, the method comprising:

obtaining imaging data representative of the first medical imaging data and the second medical imaging data, or of a difference between the first medical imaging data and the second medical imaging data;

inputting the imaging data into a trained image processing machine learning model to generate an image feature vector representative of the difference between the first medical imaging data and the second medical imaging data;

obtaining a plurality of text feature vectors, each text feature vector having been generated by a trained natural language processing machine learning model and being representative of natural language text describing a respective change in medical imaging data, wherein the image feature vector and the plurality of text feature vectors are represented in a common embedding space, wherein the trained image processing machine learning model and the trained natural language processing machine learning model have been trained by minimizing, for each set of a plurality of sets of training imaging data, a loss function between a training image feature vector generated for the set of training imaging data by the trained image processing machine learning model and a corresponding training text feature vector generated for the set of training imaging data by the trained natural language processing machine learning model;

determining, for each of the plurality of text feature vectors, a similarity measure indicating a degree of similarity between the image feature vector and the text feature vector, wherein the similarity measure is a distance measure in the common embedding space between the image feature vector and the text feature vector;

selecting a text feature vector from among the plurality of text feature vectors based on the determined similarity measures; and determining, based on the selected text feature vector, the data representing the change between the first medical imaging data and the second medical imaging data.

2. The method of claim 1 wherein the data representing the change comprises the natural language text represented by the selected text feature vector or data derived therefrom.

3. The method of claim 1 wherein determining the data representing the change comprises determining whether the natural language text represented by the selected text feature vector describes a significant change, and the data representing the change comprises an indication of whether the natural language text represented by the selected text feature vector describes a significant change.

4. The method of claim 1, comprising outputting, by the trained image processing machine learning model and based on the imaging data and the selected text feature vector, output image data representing a change between the first medical imaging data and the second medical imaging data, wherein the data representing the change comprises the output image data.

5. The method of claim 4, comprising:

generating, using the trained image processing machine learning model, a plurality of sets of image data, each set of image data representing a change between the first medical imaging data and the second medical imaging data and each set of image data being represented by a respective feature vector; and determining, for each of the plurality of sets of image data, a further similarity measure indicating a degree of similarity between the respective feature vector representing the image and the selected text feature vector, wherein the output image data is selected from among the plurality of sets of image data based on the determined further similarity measures.

6. The method of claim 1, comprising:

obtaining the first medical imaging data and the second medical imaging data, the first medical imaging data comprising a plurality of first intensity values and the second medical imaging data comprising a plurality of corresponding, second, intensity values; and for each of the plurality of first intensity values, comparing the first intensity value with the corresponding second intensity value, to obtain a differential intensity value, wherein the imaging data comprises the obtained differential intensity values.

7. The method of claim 6, wherein comparing the first intensity value with the second intensity value comprises performing a subtraction operation using the first intensity value and the second intensity value.

8. The method of claim 1, wherein the trained image processing machine learning model has been trained using a contrastive loss function.

9. The method of claim 1, comprising generating each of one or more of the plurality of text feature vectors by inputting a first medical text report associated with the first medical imaging data, and a text prompt comprising an instruction to generate, based on the first medical text report, natural language text describing a possible change to the first medical imaging data, into a trained large language model; and generating, using a trained text encoder and based on the respective generated natural language text describing the possible change, the text feature vector.

10. The method of claim 1, wherein each of the plurality of text feature vectors is representative of natural language text describing a change between respective other first medical imaging data and respective other second medical imaging data.

11. The method of claim 10, comprising generating each of one or more of the plurality of text feature vectors by inputting a respective first medical text report associated with the respective other first medical imaging data, a respective second medical text report associated with the respective other second medical imaging data, and a text prompt comprising an instruction to generate, based on the respective first medical text report and the respective second medical text report, the natural language text describing the change between the respective other first medical imaging data and the respective other second medical imaging data, into a trained large language model; and generating, using a trained text encoder and based on a respective generated natural language text describing the change, the text feature vector.

12. The method of claim 1, wherein a trained machine learning model comprises the trained image processing machine learning model and the trained natural language processing machine learning model, and the trained image processing machine learning model has been trained according to a training method comprising:

providing a machine learning model, the machine learning model comprising:

(a) an image processing machine learning model configured to generate, based on given imaging data representative of given first medical imaging data and given second medical imaging data, or of a difference between the given first medical imaging data and the given second medical imaging data, an image feature vector representative of the difference between the given first medical imaging data and the given second medical imaging data, and (b) a natural language processing machine learning model configured to generate, based on given text data representative of a given first medical text report associated with the given first medical imaging data and a given second medical text report associated with the given second medical imaging data, or of given natural language text describing a change between the given first medical imaging data and the given second medical imaging data, a text feature vector;

providing training data comprising the plurality of sets of training imaging data, each set of training imaging data being representative of first training medical imaging data and second training medical imaging data, or of a difference between the first training medical imaging data and the second training medical imaging data, the training data further comprising, for each set of training imaging data, text data representative of a first training medical text report associated with the first training medical imaging data and a second training medical text report associated with the second training medical imaging data, or of natural language text describing a change between the first training medical imaging data and the second training medical imaging data; and training the machine learning model based on the training data so as to minimize a loss function between the image feature vectors generated for the sets of training imaging data by the image processing machine learning model and the corresponding text feature vectors generated for the sets of training imaging data by the natural language processing machine learning model.

13. The method of claim 12 wherein the plurality of sets of training imaging data comprises, for each set of training imaging data, text data representative of the respective first medical text report and the respective second medical text report.

14. The method of claim 12 wherein the plurality of sets of training imaging data comprises, for each set of training imaging data, text data representative of the natural language text describing the change between a respective other first medical imaging data and a respective other second medical imaging data.

15. A system for determining data representing a change between first medical imaging data and second medical imaging data, comprising:

a non-transitory memory device for storing computer readable program code; and a processor in communication with the memory device, the processor being operative with the computer readable program code to perform steps including obtaining imaging data representative of the first medical imaging data and the second medical imaging data, or of a difference between the first medical imaging data and the second medical imaging data, inputting the imaging data into a trained image processing machine learning model to generate an image feature vector representative of the difference between the first medical imaging data and the second medical imaging data, obtaining a plurality of text feature vectors, each text feature vector having been generated by a natural language processing machine learning model and being representative of natural language text describing a respective change in medical imaging data, wherein the image feature vector and the plurality of text feature vectors are represented in a common embedding space, wherein the trained image processing machine learning model and the trained natural language processing machine learning model have been trained by minimizing, for each set of a plurality of sets of training imaging data, a loss function between a training image feature vector generated for the set of training imaging data by the trained image processing machine learning model and a corresponding training text feature vector generated for the set of training imaging data by the trained natural language processing machine learning model, determining, for each of the plurality of text feature vectors, a similarity measure indicating a degree of similarity between the image feature vector and the text feature vector, wherein the similarity measure is a distance measure in the common embedding space between the image feature vector and the text feature vector, selecting a text feature vector from among the plurality of text feature vectors based on the determined similarity measures, and determining, based on the selected text feature vector, the data representing the change between the first medical imaging data and the second medical imaging data.

16. The system of claim 15 wherein the data representing the change comprises the natural language text represented by the selected text feature vector or data derived therefrom.

17. The system of claim 15 wherein determining the data representing the change comprises determining whether the natural language text represented by the selected text feature vector describes a significant change, and the data representing the change comprises an indication of whether the natural language text represented by the selected text feature vector describes a significant change.

18. The system of claim 15, comprising outputting, by the trained image processing machine learning model and based on the imaging data and the selected text feature vector, output image data representing a change between the first medical imaging data and the second medical imaging data, wherein the data representing the change comprises the output image data.

19. The system of claim 18, comprising:

generating, using the trained image processing machine learning model, a plurality of sets of image data, each set of image data representing a change between the first medical imaging data and the second medical imaging data and each set of image data being represented by a respective feature vector; and determining, for each of the plurality of sets of image data, a further similarity measure indicating a degree of similarity between the respective feature vector representing the image and the selected text feature vector, wherein the output image data is selected from among the plurality of sets of image data based on the determined further similarity measures.

20. One or more non-transitory computer-readable media embodying instructions executable by machine to perform operations, comprising:

obtaining imaging data representative of first medical imaging data and second medical imaging data, or of a difference between the first medical imaging data and the second medical imaging data;

inputting the imaging data into a trained image processing machine learning model to generate an image feature vector representative of the difference between the first medical imaging data and the second medical imaging data;

obtaining a plurality of text feature vectors, each text feature vector having been generated by a natural language processing machine learning model and being representative of natural language text describing a respective change in medical imaging data, wherein the image feature vector and the plurality of text feature vectors are represented in a common embedding space, wherein the trained image processing machine learning model and the trained natural language processing machine learning model have been trained by minimizing, for each set of a plurality of sets of training imaging data, a loss function between a training image feature vector generated for the set of training imaging data by the trained image processing machine learning model and a corresponding training text feature vector generated for the set of training imaging data by the trained natural language processing machine learning model;

determining, for each of the plurality of text feature vectors, a similarity measure indicating a degree of similarity between the image feature vector and the text feature vector, wherein the similarity measure is a distance measure in the common embedding space between the image feature vector and the text feature vector;

selecting a text feature vector from among the plurality of text feature vectors based on the determined similarity measures; and determining, based on the selected text feature vector, the data representing the change between the first medical imaging data and the second medical imaging data.

* * * * *